(12) United States Patent
Wang

(10) Patent No.: US 7,924,023 B2
(45) Date of Patent: Apr. 12, 2011

(54) METHOD AND APPARATUS FOR MEASURING DATA RATES

(75) Inventor: Jin Wang, Union City, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

(21) Appl. No.: 12/618,692

(22) Filed: Nov. 13, 2009

(65) Prior Publication Data

US 2010/0052693 A1 Mar. 4, 2010

Related U.S. Application Data

(63) Continuation of application No. 11/461,972, filed on Aug. 2, 2006, now Pat. No. 7,639,022.

(51) Int. Cl.
*G01R 31/11* (2006.01)
(52) U.S. Cl. .................................. 324/533; 324/534
(58) Field of Classification Search .................. 324/533, 324/534
See application file for complete search history.

(56) References Cited

U.S. PATENT DOCUMENTS

| | | | |
|---|---|---|---|
| 5,479,610 A | 12/1995 | Roll-Mecak et al. | |
| 6,144,721 A | 11/2000 | Stephens | |
| 6,177,801 B1 | 1/2001 | Chong | |
| 6,266,395 B1 | 7/2001 | Liu et al. | |
| 6,417,672 B1 * | 7/2002 | Chong | 324/520 |
| 6,819,746 B1 | 11/2004 | Schneider et al. | |
| 7,639,022 B2 * | 12/2009 | Wang | 324/533 |
| 2002/0067802 A1 | 6/2002 | Smith et al. | |
| 2002/0161539 A1 | 10/2002 | Jones et al. | |
| 2003/0021391 A1 | 1/2003 | Rubin et al. | |
| 2003/0095591 A1 | 5/2003 | Rekai et al. | |
| 2005/0036560 A1 | 2/2005 | Lu et al. | |
| 2007/0025548 A1 | 2/2007 | Zheng et al. | |
| 2008/0205501 A1 * | 8/2008 | Cioffi et al. | 375/224 |

OTHER PUBLICATIONS

Aware, Inc., "Dr. DSL Diagnostics", Whitepaper, 2001 pp. 1-9.
LMS Focus Group, "Loop Management System Standards", DSL Forum 2001, pp. 1-19, Focus Group on Loop Management Systems.
Peter J. W. Melsa et al., "Single-Ended Loop Testing (SELT) Expectations and Realities", SPAY011A—Mar. 2003, pp. 1-18, Whitepaper, Texas Instruments Incorporated.

* cited by examiner

*Primary Examiner* — Jeff Natalini
(74) *Attorney, Agent, or Firm* — Guntin Meles & Gust, PLC; Pablo Meles

(57) ABSTRACT

A method, computer readable storage medium and apparatus for measuring data rates is disclosed. A method that incorporates the teachings of the present disclosure may include, for example, submitting a signal over a cable from a Time Domain Reflectometry (TDR) element, determining a fault in the cable from a reflection of the signal, determining a length of the cable from the reflection of the signal, determining a location of a bridged tap relative to customer premise equipment (CPE) and determining effective downstream bit rates for the cable according to the fault, the length of the cable and the location of the bridged tap relative to the CPE. Additional steps and embodiments are disclosed.

15 Claims, 5 Drawing Sheets

100

200

| Tap Location (ft from CPE) | Tap Length (ft, 24 G) | | | | | | | | | | |
|---|---|---|---|---|---|---|---|---|---|---|---|
| | <15 ft | 20 ft | 30 ft | 40 ft | 50 ft | 70 ft | 100 ft | 200 ft | 300 ft | 500 ft | 1000 ft |
| 0 ft | 0% | -8% | -29% | -39% | -29% | -45% | -48% | -44% | -44% | -42% | -40% |
| 250 ft | 0% | -6% | -21% | -29% | -21% | -35% | -39% | -34% | -34% | -33% | -31% |
| >500 ft | 0% | -2% | -7% | -10% | -6% | -17% | -21% | -15% | -15% | -16% | -15% |

600

700

METHOD AND APPARATUS FOR MEASURING DATA RATES

CROSS-REFERENCE TO RELATED APPLICATIONS

This application is a continuation of U.S. patent application Ser. No. 11/461,972, filed Aug. 6, 2006 and titled "Method and Apparatus for Measuring Data Rates," the entirety of which is herein incorporated by reference.

FIELD OF THE DISCLOSURE

The present disclosure relates generally to communication systems, and more specifically to a method and apparatus for measuring data rates.

BACKGROUND

Time Domain Reflectometers (TDRs) can be utilized for analyzing the characteristics of xDSL lines. Measurable characteristics can include cable length, bridged taps and cable faults. Although TDR testers can be useful to field technicians for troubleshooting xDSL lines, they do not provide a means to determine an effective throughput of the xDSL line under analysis.

It would be desirable for field technicians installing xDSL services to be able to determine during the installation process whether a particular xDSL cable can satisfy a desired performance. Accordingly, a need arises for a method and apparatus that measures data rates.

DETAILED DESCRIPTION

Embodiments in accordance with the present disclosure provide a method and apparatus for measuring data rates.

In a first embodiment of the present disclosure, a computer-readable storage medium can have computer instructions for submitting from a Time Domain Reflectometry (TDR) element a signal over a cable, determining from a reflection of the signal a length of the cable and a length of a bridged tap and relative location to customer premise equipment (CPE), and determining an effective downstream bit rate, and an effective upstream bit rate for the cable according to the length of the cable and the length of the bridged tap and its relative location to the CPE.

In a second embodiment of the present disclosure, a diagnostic system can have a Time Domain Reflectometer (TDR) element that submits a signal over a cable and determines from its reflection in the cable a length of the cable and a length of a bridged tap, and a diagnostic element that determines downstream and upstream bit rates for the cable according to the length of the cable and the length of the bridged tap.

In a third embodiment of the present disclosure, a method can have the step of determining downstream and upstream bit rates of a cable according to a length of the cable and a length of a bridged tap from a signal reflected on said cable.

Figure 1:
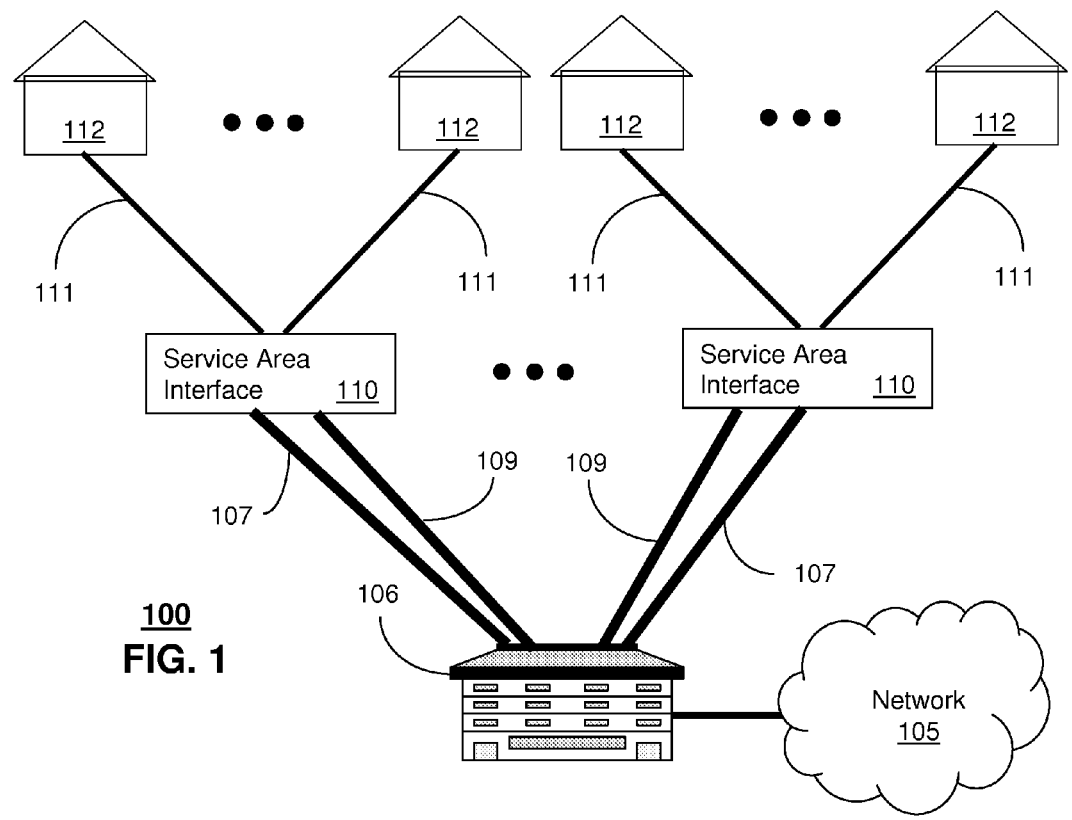
FIG. 1 depicts an exemplary block diagram of a communication system.

FIG. 1 depicts an exemplary block diagram of a communication system 100. The communication system 100 comprises a central office (CO) 106 and a plurality of service area interfaces (SAIs) 110 each coupled to a plurality of buildings 112. The CO 106 houses common network switching equipment for distributing local and long-distance telecommunication services supplied by network 105 to buildings 112 (such as dwellings or commercial enterprises) by way of the SAI 110. For illustration purposes only, buildings 112 will be referred to herein as residences 112. Telecommunication services of the CO 106 can include traditional circuit-switched services such as POTS (Plain Old Telephone Service) and/or packet-switched services such as HDTV, VoIP (Voice over Internet Protocol), IPTV (Internet Protocol Television), and Internet data supplied to a residence 112 by way of for example VDSL technology operating over legacy twisted pair cable lines 111.

Links 107 can be twisted copper pairs for distributing power to the SAIs 110. The SAI 110 can be coupled to optical and/or electrical cables 109 supplied by the CO 106, which carries any one or more of the aforementioned communications services. These services can be processed in part by active circuits in the SAI 106 and/or circuits at the residences 112. Each cable 109 carries communication lines numbering in the tens or hundreds. The SAI 110 serves to distribute portions of the communication cables 109 among the residences 112 as dedicated communication links 111. Thus, the SAI 110 serves as a local cross-connect system for unbundling communication lines in cable 109.

Figure 2:
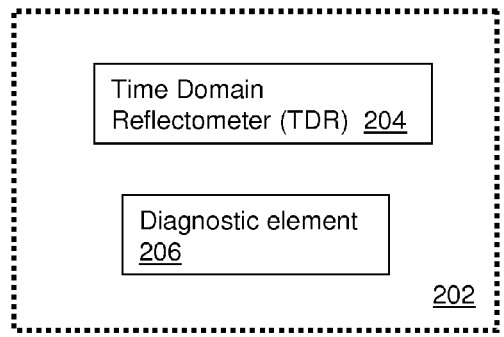
FIG. 2 depicts an exemplary block diagram of a diagnostic system for measuring data rates in the communication system.

FIG. 2 depicts an exemplary block diagram of a diagnostic system 200 for measuring data rates in the communication system 100. The diagnostic system 200 can comprise a Time Domain Reflectometer (TDR) 204 and a diagnostic element 206. The TDR 204 and diagnostic element 206 can operate as independent software and/or hardware components or collectively as system 202. The TDR 204 utilizes common technology well known in the art for generating TDR signals over a cable interface and for analyzing reflections in said cable. The diagnostic system 200 can be utilized to measure a data rate of a select xDSL line during installation, maintenance, repair or some other field activity.

Figure 3:
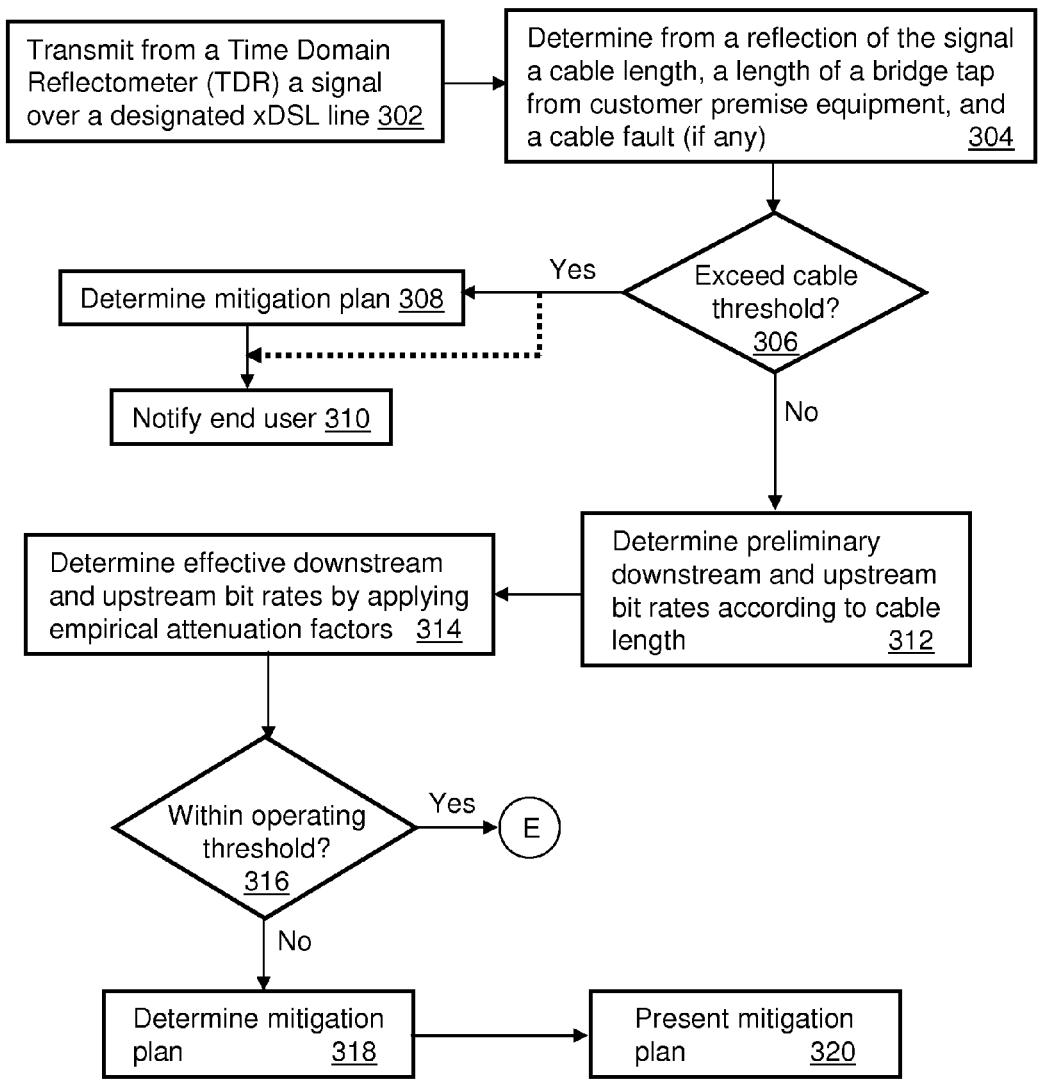
FIG. 3 depicts an exemplary method operating in the diagnostic system.

FIG. 3 depicts an exemplary method 300 operating in the diagnostic system 200. Method 300 begins with step 302 in which the TRD 204 transmits a signal over a select cable 111 from, for example, a test point at the SAI 110. The TDR 204 utilizing techniques well known in the art determines in step 304 from a reflection of the signal transmitted a length of the cable and lengths of one or more bridged taps (if any are present) near customer premise equipment (CPE) of a residence 112. The TDR 204 can also detect cable faults if present.

Figure 6:
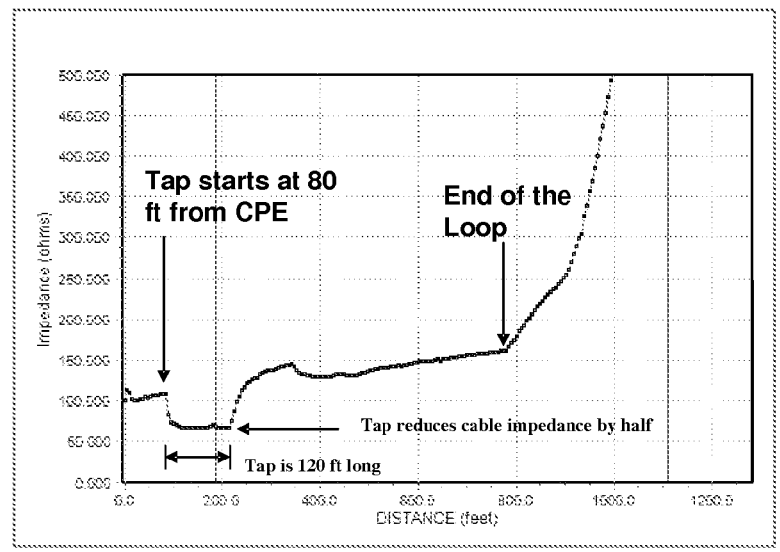
FIGS. 6-7 depict Time Domain Reflectometry (TDR) measurements for characterizing an xDSL line.

A bridged tap is typically a wire which hangs from a pair of lines in cable 111. Bridged taps create a reflection point for high frequency waves on the line creating problems for xDSL services. A reflected signal is generally out of phase and mixed with the original. A modem at a residence 112 receiving the mixed signal can incur data errors and may have trouble synchronizing. If the bridged tap is long, by the time the signal bounces back, the original signal is far ahead having higher amplitude. Consequently, the modem ignores the weaker signal and operates properly. Almost every cable pair in the world has bridged taps from legacy infrastructure. FIG. 6 illustrates the detection of a tap having a length of 120 feet located 80 feet from the CPE.

Figure 7:
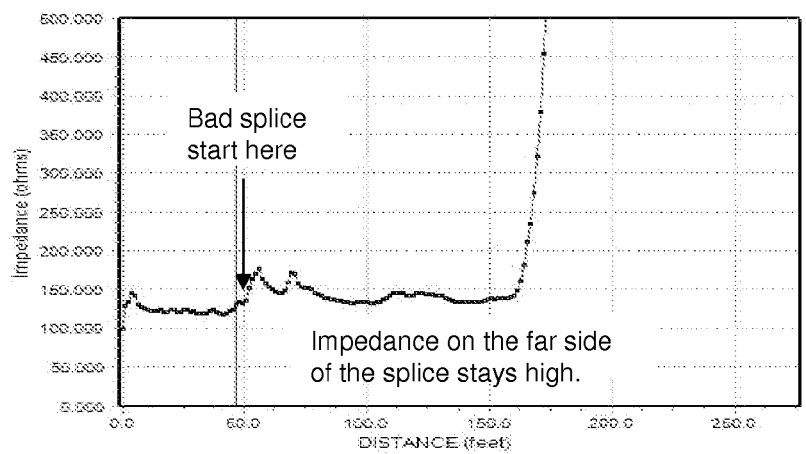

Cable faults occur when there's a discontinuity in a cable, which can arise for any number of reasons. For example, cable 111 can have a portion with an untwisted pair, improper splicing, splits, broken shields, bad connections, bad grounding, or any other form of impairment that can distort signals carried by the cable 111. The severity of a cable fault can be determined from a change of impedance due to the fault. FIG. 7 illustrates a discontinuity arising from a bad splice.

Once the length of the cable is known, the diagnostic system 200 can proceed to step 306 where it determines the length measured exceeds a threshold length. The threshold length can be selected by a service operator (e.g., 5000 feet) based on a desired operating downstream and upstream bit rate. For example, if the desired downstream bit rate is 30 Mega bits per second (Mbps), it can be determined from the empirical graph of FIG. 4 that the length of the cable cannot exceed approximately 3000 feet.

If in step 306 the diagnostic system 200 determines that the threshold has been exceeded, then it can proceed to step 308 where it determines a mitigation plan. The mitigation plan can be determined by the diagnostic system 200 according to available network topology information describing the SAI 110 and a number of residences 112 served thereby. This information can be extracted from the CO 106 or can be pre-stored in the diagnostic system 200. The mitigation plan can represent any solution that can be used to improve the downstream bit rate such as, for example, pairing multiple cables 111 to increase throughput, selecting a shorter cable 111 to service the residence 112, and so on. Once the mitigation plan is determined, the diagnostic system 200 can convey it to an end user in step 310 by a common visual or audible user interface (UI). If the diagnostic system 200 does not have the sophistication to determine a mitigation plan, it can proceed from step 306 to step 310 and notify the field technician that the threshold had been exceeded without a proposed solution.

Figures 4, 5:
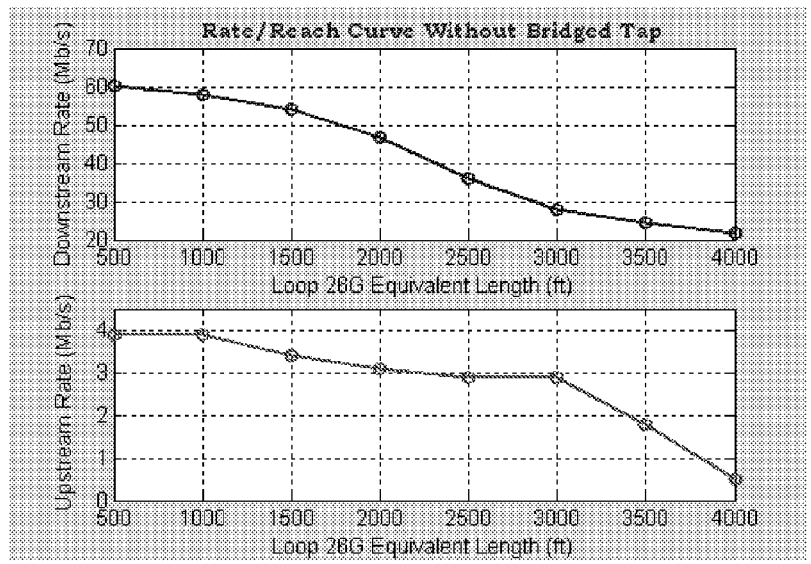
FIGS. 4-5 depict empirical measurements for determining a data rate of an xDSL line.

Referring back to step 306, if the cable threshold is not exceeded, the diagnostic system 200 proceeds to step 312 where it determines preliminary downstream and upstream bit rates from FIG. 4 using the cable length. For example, if the cable length is 2000 feet then the downstream bit rate is ideally 47 Mbps, and the upstream bit rate is ideally 3 Mbps. Once the preliminary rates have been determined, the diagnostic system 200 proceeds to step 314 where it determines an effective downstream bit rate, and an effective upstream bit rate by applying attenuation factors determined from empirical analysis. For example, assume a bridged tap is found having a length of 100 feet, and is located 250 feet away from the CPE. These figures translate to an attenuation factor of 39%. Applying the attenuation factor to the previous example, the effective downstream bit rate can be determined to be approximately 28 Mbps (assuming no cable faults are present).

FIG. 4 depicts attenuation factors determined empirically for downstream data flow. Similar, empirical tables can be created for upstream data flow for taps, and downstream and upstream data flows for different types of cable faults. Accordingly, step 314 can be used to determine effective downstream and upstream bit rates for combinations of taps and faults.

Once the effective bit rates have been determined, they are compared by the diagnostic system 200 to a desired operating threshold in step 316 (e.g., better than or equal to 20 Mbps downstream, 300 Kbps upstream). If the threshold is satisfied, the diagnostic system 200 ends operations. Otherwise, it proceeds to step 318 where it determines a mitigation plan to workaround a shortfall. As before, the mitigation plan can involve pairing cables, removing bridged taps, selecting another cable pair, and so on. The diagnostic system 200 can be programmed to apply a number of scenarios for improving the performance of the xDSL service supplied to a customer. Once the mitigation plan is determined, it is presented to the end user in step 320 by way of the diagnostic system's UI.

It would be evident to an artisan with ordinary skill in the art that the aforementioned embodiments of the diagnostic system 200 can be modified, reduced, or enhanced without departing from the scope and spirit of the claims described below. For example, the diagnostic system 200 can be programmed to determine effective bit rates for upstream and downstream traffic only. In which case, steps 308-310, and 316-320 can be removed without departing from the scope of the claims. This is but one example of a viable modification that can be applied to the present disclosure. The reader is therefore directed to the claims below for a fuller understanding of the breadth and scope of the present disclosure.

Figure 8:
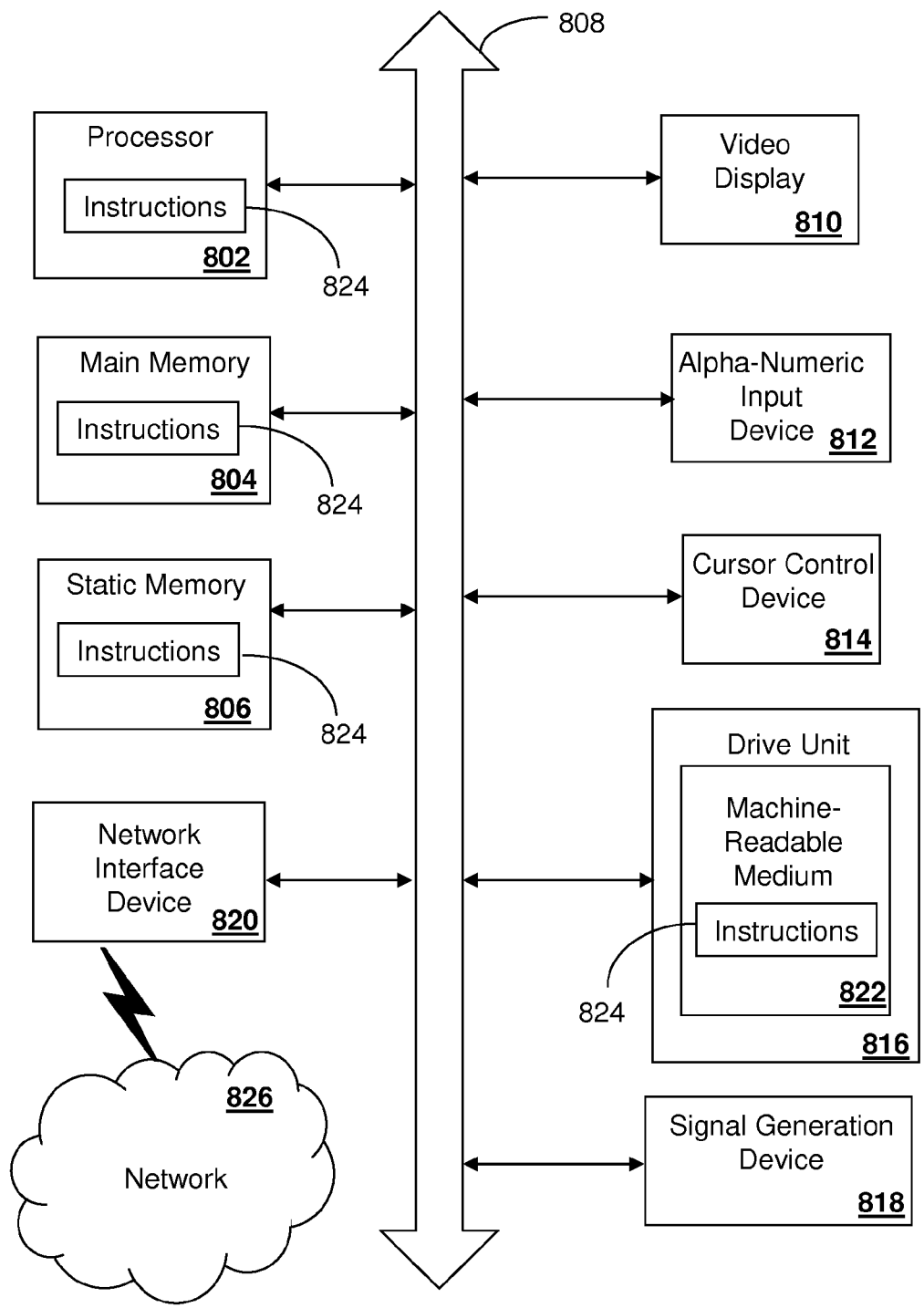
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    determining effective downstream and upstream bit rates of a cable according to a comparison of empirical measurements to a fault by submitting a signal over a cable using a Time Domain Reflectometer (TDR) element; and
    determining the fault in the cable from a reflection in the cable of the signal and according to a comparison of a length of a bridged tap and its relative location to customer premise equipment (CPE) with empirical measurements comprising attenuation factors indexed by the length of the bridged tap and its relative location to the CPE.

2. The method of claim 1, comprising:
    comparing the effective downstream and upstream bit rates to an operating threshold;

determining a mitigation plan to improve the bit rate performance of the cable in response to the effective downstream and upstream bit rates falling below the operating threshold; and presenting the mitigation plan to an end user.

3. The method of claim 1, comprising:

determining from the reflection of the signal a fault in the cable; and determining the effective downstream and upstream bit rates for the cable according to a comparison of the empirical measurements to the fault.

4. The method of claim 3, comprising:

comparing the effective downstream and upstream bit rates to an operating threshold;

determining a mitigation plan to improve the bit rate performance of the cable in response to the effective downstream and upstream bit rates falling below the operating threshold; and presenting the mitigation plan to an end user.

5. The method of claim 1, comprising:

comparing a length of the cable to a threshold length;

determining a mitigation plan to improve the bit rate performance of the cable in response to the length of the cable exceeding the threshold length; and presenting the mitigation plan to an end user.

6. The method of claim 1, comprising:

comparing the length of the cable to a threshold length; and submitting a message to an end user in response to the length of the cable exceeding the threshold length.

7. The method of claim 1, comprising:

presenting the effective downstream and upstream bit rates to an end user.

8. The method of claim 1, comprising:

determining preliminary downstream and upstream bit rates according to the length of the cable from the reflection of the signal;

determining effective downstream and upstream bit rates by applying empirical attenuation factors; and comparing the effective downstream and upstream bit rates to an operating threshold.

9. A non-transitory computer readable storage medium, the storage medium being embedded with computer instructions for causing a computing device to perform the steps of:

submitting a signal over a cable using a Time Domain Reflectometer (TDR) element;

determining a fault in the cable from a reflection of the signal and according to a comparison of a length of a bridged tap and its relative location to customer premise equipment (CPE) with empirical measurements comprising attenuation factors indexed by a length of a bridged tap and its relative location to the CPE;

determining effective downstream bit rates of the cable according to a comparison of empirical measurements to a fault.

10. The computer readable storage medium of claim 9, further comprising computer instructions to perform the steps of:

determining a length of the cable from the reflection of the signal;

determining a length of a bridged tap from the reflection of the signal; and determining a location of a bridged tap relative to customer premise equipment (CPE).

11. The computer readable storage medium of claim 10, further comprising computer instructions to perform the steps of:

determining effective downstream and upstream bit rates for the cable according to the fault, the length of the cable, the length of the bridged tap and the location of the bridged tap relative to the CPE.

12. The computer readable storage medium of claim 11, further comprising computer instructions to perform the steps of:

comparing the effective downstream and upstream bit rates to an operating threshold; and determining a mitigation plan to improve the bit rate performance of the cable.

13. The computer readable storage medium of claim 10, further comprising computer instructions to perform the steps of:

determining preliminary downstream and upstream bit rates according to the length of the cable from the reflection of the signal; and determining the effective downstream and upstream bit rates by applying attenuation factors to the preliminary downstream and upstream bit rates.

14. The computer readable storage medium of claim 10, further comprising computer instructions to perform the steps of:

comparing the length of the cable to a threshold length; and submitting a message to an end user in response to the length of the cable exceeding the threshold length.

15. The computer readable storage medium of claim 9, further comprising computer instructions to perform the steps of:

comparing the effective downstream and upstream bit rates to an operating threshold;

determining a mitigation plan to improve the bit rate performance of the cable; and presenting the mitigation plan to an end user.

* * * * *